R. L. FRINK.
REGULATING APPARATUS FOR FURNACES.
APPLICATION FILED JULY 16, 1908.

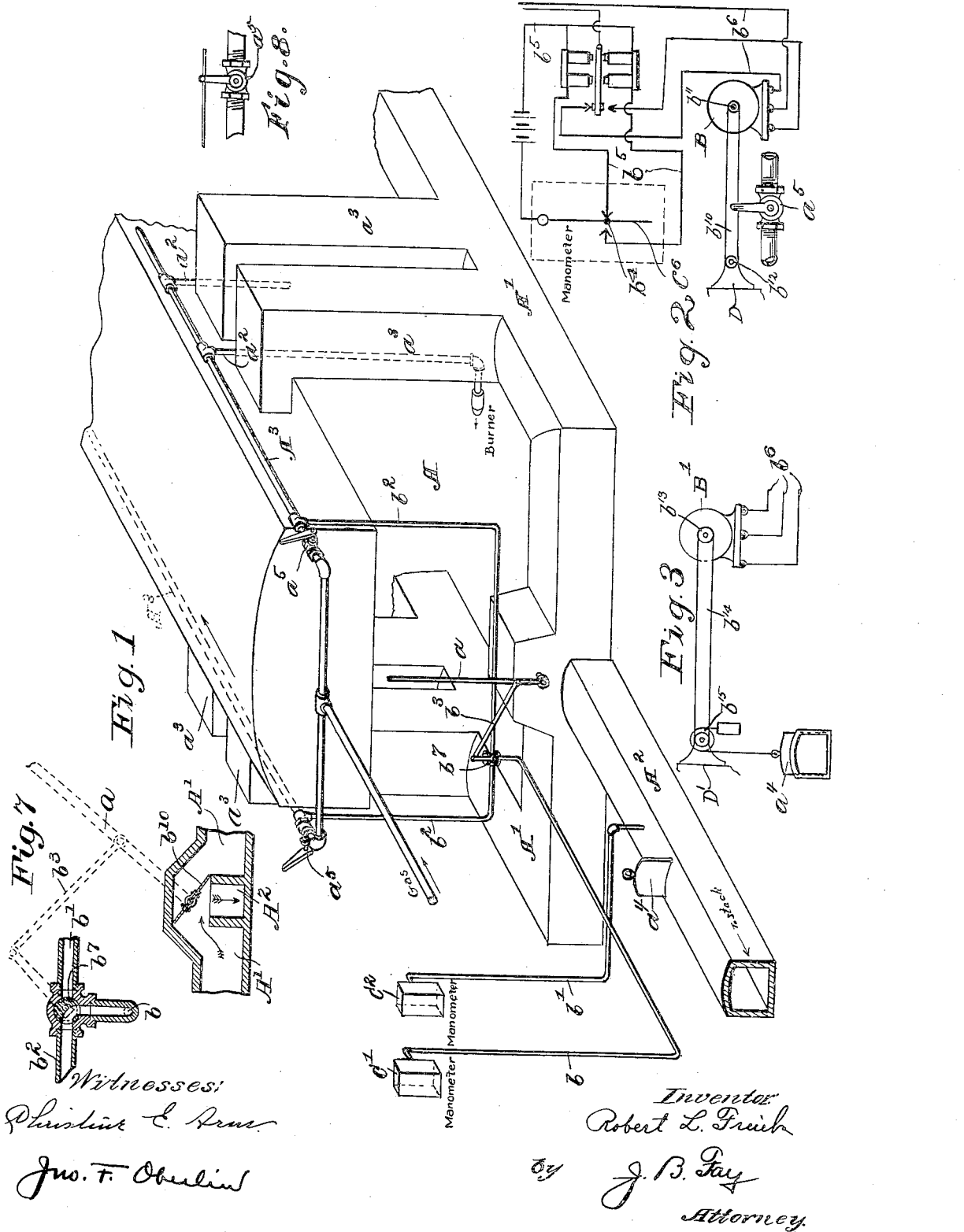

1,129,083.

Patented Feb. 23, 1915.

3 SHEETS—SHEET 2.

Witnesses:
J. C. Turner
Jno. F. Oberlin

Inventor:
Robert L. Frink
by J. B. Fay
Attorney.

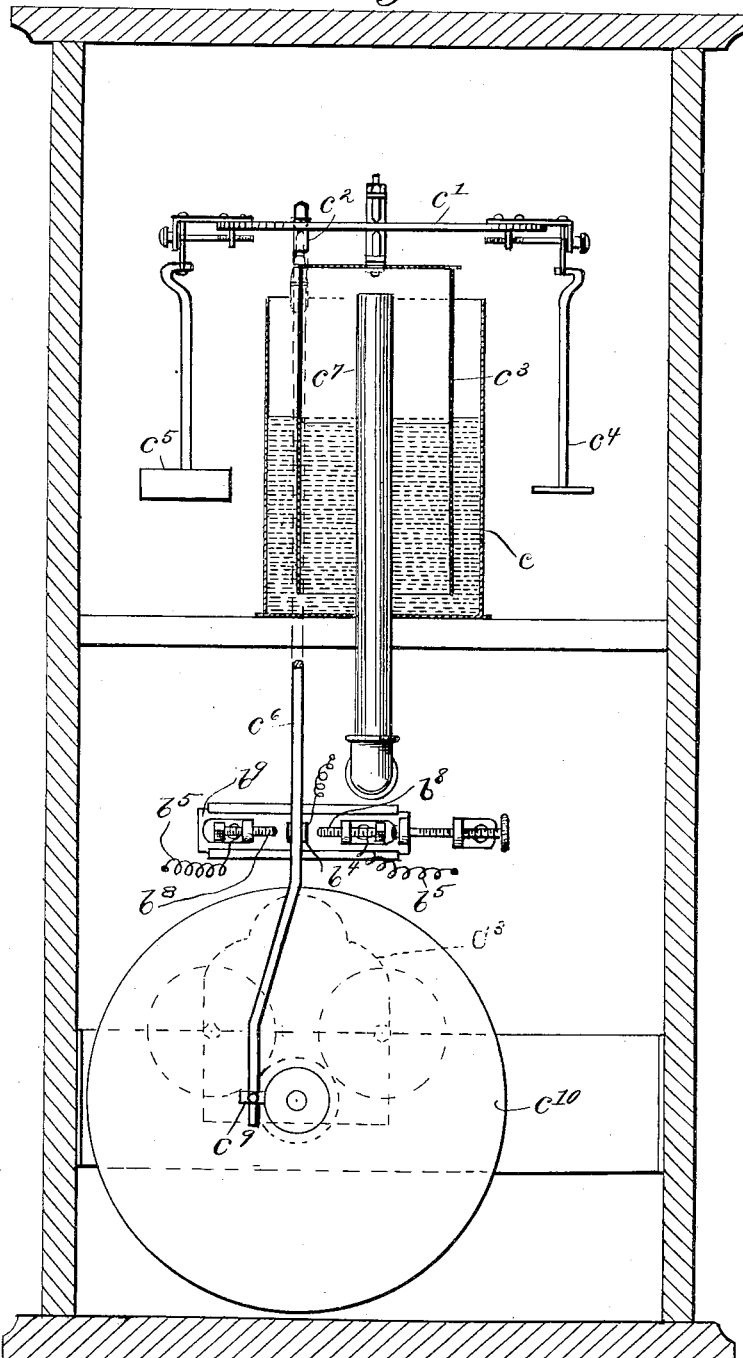

UNITED STATES PATENT OFFICE.

ROBERT L. FRINK, OF CLEVELAND, OHIO.

REGULATING APPARATUS FOR FURNACES.

1,129,083.  Specification of Letters Patent.  Patented Feb. 23, 1915.

Application filed July 16, 1908. Serial No. 443,782.

*To all whom it may concern:*

Be it known that I, ROBERT L. FRINK, a citizen of the United States, resident of Cleveland, county of Cuyahoga, and State of Ohio, have invented a new and useful Improvement in Regulating Apparatus for Furnaces, of which the following is a specification, the principle of the invention being herein explained and the best mode in which I have contemplated applying that principle, so as to distinguish it from other inventions.

This, my present invention, relates as indicated, to regulating apparatus for furnaces and has more particularly regard to the regulation of the heating of furnaces, such as are used in melting glass and maintaining the same at a proper temperature for drawing or other operations. It is contemplated however that not only will my method of, and apparatus for, thus regulating the heating of furnaces be applicable to the various kinds of melting and tank furnaces employed in the glass industry, but also to various other kinds of kilns and furnaces that are operated in more or less analogous fashion.

The object of the invention is the provision of means whereby the heating of such furnaces may be automatically controlled and that in an easier and more satisfactory fashion than has heretofore been attained in any type of automatic regulating apparatus of which I am aware.

To the accomplishment of the above and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 4:
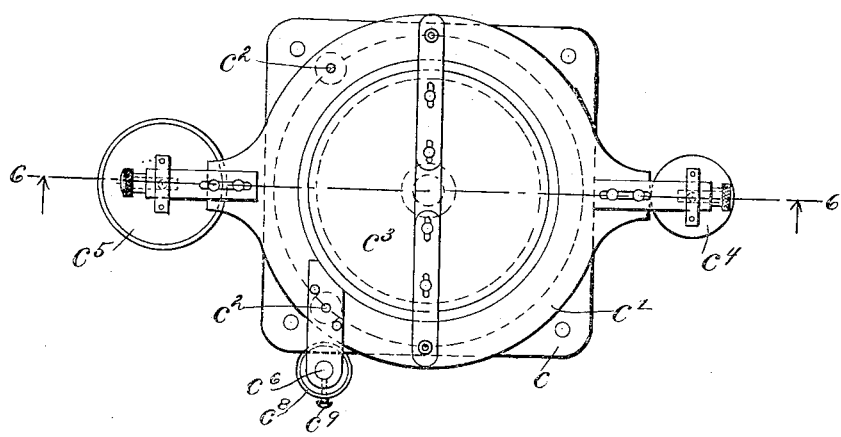
Figure 5:
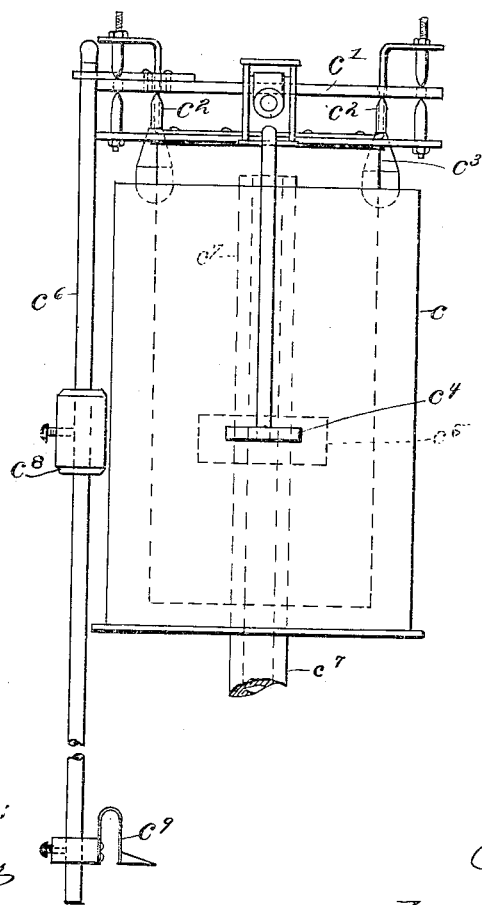

In said annexed drawings:—Figure 1 is a perspective view showing in diagrammatic fashion the disposition of flues and other appurtenant parts, including my improved regulating apparatus, in a glass melting or tank furnace designed to be heated by gas, which is the kind of fuel usually employed in furnaces of this type; Fig. 2 is a diagram representing wiring connections designed for use in connection with such regulating apparatus, either to operate the damper in the flue leading to the stack or to operate the fuel supply control valve, as the case may be, the valve being thus shown in said diagram. Fig. 3 is a similar diagram illustrating the damper for controlling the flue; Fig. 4 is a plan view of the regulating apparatus, proper, whereby such damper and fuel supply control valve are operated; Fig. 5 is a side elevation of such regulating apparatus; and Fig. 6 is partly a front plan and partly a vertical section of the same, the section being on the line 6—6, Fig. 4. Fig. 7 is a vertical section through the stack and gas pipes, showing the valve mechanism in each. Fig. 8 is a side elevation showing an enlarged view of the valve operating means shown in Fig. 2.

The principle of regulation upon which my improved system and apparatus is based is that of controlling the heating of the furnace by the pressure or rather draft which is pressure minus in the stack of such furnace. As is well understood, this draft is created by the difference in pressure between the cooler air on the outside of such stack and the heated gases within, whereby such heated gases are caused to rise, tending to produce a vacuum within the stack and connected flues of the furnace. Obviously, depending upon the strength of such draft, or in other words, the difference between the pressures aforesaid, the combustive elements effective in heating the furnace, which in the case in hand are the gaseous fuel and the oxygen of the air that combines therewith, will be drawn into the furnace and consumed in greater or less amounts and with consequently increased or diminished heating effect. In general then my invention comprehends the control, first of the draft itself, or in other words, the suction effect exercised on the air and gas inlets of the furnace by the pressure or draft in such stack, and secondly the direct control of the amount of gas admitted through the gas or fuel mains in the same fashion.

In the approved arrangement of apparatus illustrated in Fig. 1, A designates the furnace area of a glass melting furnace of familiar construction, such furnace being inclosed by suitable walls, not shown. Leading from either side of the furnace are the branched lateral flues A' that finally unite to form the single flue extending to the stack (not shown) of the furnace, by which stack the necessary draft is maintained to enable the furnace to operate. In furnaces of this class it is usual, as will be readily understood, to use the flues first along one side of the furnace and then the other, fixed periods of use being set for each set of flues. To this end a suitable swinging damper or valve is provided at the junction of such lateral flues A′ with the main flue $A^2$ that leads to the stack, whereby such connection may be varied as desired. The mechanism for simultaneously closing the flues on one side of the furnace and opening the gas supply pipe on the other is shown in Fig. 7 and is too simple to require detailed description. The swinging damper $b^{10}$ is adapted to completely disconnect either side of the furnace from the stack while the valve $b^7$ is simultaneously operated by the lever $a$ through the connection $b^3$, thus opening the gas supply pipe to the side of the furnace left open and closing the supply pipe to the other side. Only the lever $a$ for operating this valve is shown.

Paralleling the sides of the furnace are the gas supply mains $A^3$ respectively controlled by valves or gates $a^3$ and leading to a series of burners $a^2$ along each side of the furnace adjacent to the branches $a^3$ of the respective lateral flues A′. In the main flue leading to the stack there is provided a damper $a^4$ by the raising or lowering of which the suction effect of the stack on the furnace may be suitably varied despite variations in the pressure, or draft, in such stack, as will be likewise readily understood. In the instance in hand my regulating apparatus specifically relates to the adjustment of the control valves $a^5$ in the gas mains $A^3$ and to the adjustment of such damper $a^4$, both features of control being illustrated in the furnace in Fig. 1. In other words, a constant supply of gas might be determined upon and a varying heating effect secured by simply varying the air supply through proper adjustment of the damper in the main flue aforesaid, although such arrangement would not ordinarily be the most economical one. As a part, then, of the regulating apparatus proper, attention is first directed to a manometer C′ which is connected with each of gas mains $A^3$ by means of a branched duct $b$. Such connection is optionally had with either main, according as the burners on the corresponding side of the furnace are, or are not in use, by a valve $b^7$ located at the juncture of the branches $b^2$ with the duct $b$. The valve $b^7$ is conveniently connected, as by a link $b^3$, with the lever $a$, so as to be operated in unison with the valve controlling the connection of branch flues A′ with main flue $A^2$. The valves $a^5$ for varying the supply of gas through the respective mains $A^3$ are located between the source of supply and the point where duct $b^2$ connects with such main. It will hence follow that the actuation of the manometer will be a resultant effect of the varying pressure behind such valve and the varying suction effect of the stack, the last named effect being communicated through the flues $A^2$, A′ and the burners to the point of connection in question.

The movable element $b^4$ of manometer C′ is adapted, see Fig. 2, to close, in either of its two adjustable extreme positions, a relay circuit $b^5$ whereby a control circuit $b^6$ is in turn closed to reversibly operate a motor B, as will be clear from the figure, aforesaid. This motor is connected by a band or flexible coupling running over a pulley, concentrically mounted on and driven by the motor B, to the lever operating the valve $a^5$. The lower side of the band is connected to this lever and the valve is thus opened or closed by the action of the motor depending upon the direction of movement of the same. It will be understood that the operative connections between the motor and valve are diagrammatic in character, there being numerous approved forms of mechanism available for this purpose. The same remark applies to the particular arrangement of circuits and contacts shown in Fig. 2. These are, so far as present purposes are concerned, merely illustrative. For adjusting the position of damper $a^4$ in main flue $A^2$ leading to the stack, a second manometer $C^2$, similar in all respects to the one just described, is employed. Actuation of this second manometer, however, is preferably made directly dependent upon variations of the pressure in such flue $A^2$ and to this end is connected therewith by a duct $b′$ as shown, Fig. 1. A second motor B′ having suitable operative connections with such damper, Fig. 3, in conjunction with relay and control circuits, similar to those already described, afford the means whereby manometer $C^2$ is effective to raise or lower damper $a^4$ as conditions may demand.

The motor control consists of the motors B and B′ which operate belts $b^{10}$ and $b^{14}$, respectively, the latter running over the pulleys $b^{11}$ and $b^{12}$ and $b^{13}$ and $b^{15}$. The pulleys $b^{11}$ and $b^{13}$ are concentric with the motors B and B′, while the pulleys $b^{12}$ and $b^{15}$ are mounted upon brackets D and D′. The motor B operates the valve $a^5$ upon rotation by moving the operating handle of this valve shown in Fig. 2, while the motor B′ operates the gate valve $a^4$ by means of the cord running over the pulley $b^{15}$.

Turning to Figs. 4, 5 and 6, the manometer will be seen to comprise, in the preferred construction there illustrated, an open vessel $c$ containing a suitable liquid, a plate $c′$ pivotally mounted on pins $c^2$ forming a transverse axis above said vessel and a second vessel $c^3$ inverted within said first vessel and inclosing the end $c^7$ of the duct $b$ or $b'$ leading from the gas mains $A^3$ or flue $A^2$, as the case may be, to the particular manometer $C'$ or $C^2$ in question. This duct rises safely above the level of the liquid in the outer vessel and as will be obvious, variations of pressure in the gas main or flue, by reason of the connection thus had, will cause the inverted vessel of the manometer to rise and fall responsively. The respective ends of the pivotally mounted plate $c'$ connected with such rising and falling vessel are provided with counterweight means $c^4$, $c^5$ so that such vessel may be balanced at any desired predetermined pressure. Rigidly attached to the plate $c'$, and depending therefrom, is an indicator arm $c^6$ constituting the movable element $b^4$ already referred to. Specifically the latter is a block connected with one of the three lines entering into relay circuit $b^5$ and adapted to contact with the ends of either of two adjustable set screws $b^8$ that form the terminals of the other two lines of such circuit. The latter being mounted on a slide $b^9$ are not only thus independently, but also jointly, adjustable.

A sliding weight $c^8$ on arm $c^6$ serves to assist counterweight $c^4$, $c^5$ in balancing the apparatus at the desired pressure, as also to vary the sensitiveness of the same. Said arm is also provided, near its lower end, with a marker $c^9$ that coöperates with a record sheet $c^{10}$ carried by suitable clock actuated mechanism $C^3$.

The mode of operation of my improved regulating apparatus should be fully apparent from the foregoing description of the construction and operation of its component parts. It should be equally apparent that by such apparatus I am enabled to control the heating of a furnace very closely in spite of the seemingly indirect character of the regulation. Indeed the results attained thereby are much more satisfactory than where thermostatic means are utilized. The apparatus is not only accurately and quickly responsive to atmospheric changes, but even to the slight inequalities always existing between the branches of the flues leading to the stack. When, in addition, the pressure of the fuel in the gas supply means is similarly taken into account as in the arrangement illustrated, the results possess a very satisfactory degree of constancy.

It need scarcely be remarked that, just as the particular arrangement of electric circuits for effecting operation of either the damper or valve from the corresponding manometer is a matter of indifference, so other operating means than the electric current may be utilized in this connection, such for example as hydraulic or pneumatic pressure. In apparatus employing either of the last-named media, a pilot valve usually serves in the same fashion as does the relay in the electrical apparatus illustrated; this detail of the operating mechanism, whatever the specific character of the latter, may be referred to as pilot means.

Other modes of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention:—

1. The combination with a furnace; of means for regulating the heating of said furnace, such means including a damper for varying the draft in the stack of said furnace, and means for varying the fuel supply; and two manometers respectively adapted to actuate said damper and said fuel-supply varying means, the first of said manometers being affected by the pressure in said stack and the second by the pressure of the fuel supply.

2. The combination with a furnace; of means for regulating the heating of said furnace, such means including a damper for varying the draft in the stack of said furnace, and means for varying the fuel supply; and two manometers respectively adapted to actuate said damper and said fuel-supply varying means, the first of said manometers being affected by the pressure in said stack only and the second by the resultant of such pressure and that of the fuel supply.

3. The combination with a furnace; of means for regulating the heating of said furnace, such means including a damper for varying the draft in the stack of said furnace, and means for varying the fuel supply; and two manometers, one of said manometers being adapted to be operated by the pressure in such stack and being adapted to actuate such damper, said second manometer being adapted to be operated by the pressure of such fuel supply and being adapted furthermore, to actuate said means for varying the fuel supply; each of said manometers being provided with pilot means, a movable arm for opening and closing such pilot means, and other means adapted to operate such pilot means.

4. A regulating device comprising a control circuit, an open vessel containing suitable liquid, a plate pivotally mounted on a transverse axis above said vessel, an arm borne by said plate and adapted to open and close said circuit, a fluid pressure supply pipe extending upwardly within said vessel, and a second vessel inverted within said first vessel and inclosing the end of said pipe, said second vessel being pivotally connected with said plate.

5. A regulating device comprising a control circuit, an open vessel containing suitable liquid, a plate pivotally mounted on a transverse axis above said vessel, an arm borne by said plate and adapted to open and close said circuit, a fluid pressure supply pipe extending upwardly within said vessel, a second vessel inverted within said first vessel and inclosing the end of said pipe, said second vessel being pivotally connected with said plate, and means for balancing the latter.

6. In combination with a furnace having a stack and a fuel supply pipe, means adapted to regulate the heating of said furnace, and other means operated partly by the draft in such stack and partly by the pressure in such supply pipe, said other means being adapted to control said first-named means.

7. In combination with a furnace having a stack and fuel supply pipe, means adapted to regulate the heating of said furnace, and a manometer operated partly by the draft in such stack and partly by the pressure in such supply pipe, said manometer being adapted to control said first-named means.

8. The combination with a furnace; of means for regulating the heating of said furnace, such means including a damper for varying the draft in the stack of said furnace, and means for varying the fuel supply; and two manometers, one of said manometers being operable by the pressure in such stack and being adapted to control each damper, the other being adapted to actuate said means for varying the fuel supply; each of said manometers comprising an open vessel containing a suitable liquid, a fluid pressure supply and a second vessel inverted within said first vessel and connected with said fluid pressure, a central circuit, and means operated by said manometer for closing said circuit.

Signed by me this 3d day of July, 1908.

ROBERT L. FRINK.

Attested by—
 CHRISTINE E. ARUS,
 JNO. F. OBERLIN.